United States Patent
Park et al.

(10) Patent No.: US 10,523,358 B1
(45) Date of Patent: Dec. 31, 2019

(54) SYSTEMS AND METHODS FOR DYNAMICALLY SWITCHING UPLINK WAVEFORMS FOR A WIRELESS DEVICE IN A WIRELESS NETWORK

(71) Applicant: Sprint Spectrum LP, Overland Park, KS (US)

(72) Inventors: Justin Sungki Park, Ashburn, VA (US); Durga Prasad Satapathy, Ashburn, VA (US); Saied Kazeminejad, Ashburn, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 15/993,843

(22) Filed: May 31, 2018

(51) Int. Cl.
*H04L 1/02* (2006.01)
*H04L 1/00* (2006.01)
*H04B 7/0417* (2017.01)
*H04J 11/00* (2006.01)

(52) U.S. Cl.
CPC ......... *H04L 1/0003* (2013.01); *H04B 7/0417* (2013.01); *H04J 11/00* (2013.01); *H04L 1/0009* (2013.01); *H04L 1/0035* (2013.01)

(58) Field of Classification Search
CPC ....... H04L 1/0618; H04L 1/06; H04L 5/0048; H04B 7/0417; H04W 52/146; H04W 52/367
USPC ........................................ 375/267, 130, 260
See application file for complete search history.

(56) References Cited

U.S. PATENT DOCUMENTS

| | | | | |
|---|---|---|---|---|
| 2011/0243012 A1* | 10/2011 | Luo | ........................ | H04L 5/0055 370/252 |
| 2011/0305179 A1* | 12/2011 | Wang | .................... | H04L 1/0031 370/311 |
| 2018/0332542 A1* | 11/2018 | Wang | .................... | H04L 5/0048 |

FOREIGN PATENT DOCUMENTS

| | | |
|---|---|---|
| WO | 2018/027796 A1 | 2/2018 |
| WO | 2018/029988 A1 | 2/2018 |

* cited by examiner

*Primary Examiner* — Khai Tran (57) ABSTRACT

A system for switching an uplink waveform for a wireless device in a wireless network includes an access node configured to deploy a first radio air interface to provide wireless services to the wireless device. The access node includes a processor configured to receive a signal indicating a channel condition from the wireless device. The processor is also configured to determine whether to switch the uplink waveform for the wireless device based on the signal indicating the channel condition.

18 Claims, 6 Drawing Sheets

| CQI Index | modulation | code rate x 1024 | efficiency |
|---|---|---|---|
| 0 | | out of range | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

FIG. 6

SYSTEMS AND METHODS FOR DYNAMICALLY SWITCHING UPLINK WAVEFORMS FOR A WIRELESS DEVICE IN A WIRELESS NETWORK

TECHNICAL BACKGROUND

A wireless network, such as a cellular network, can include an access node serving a number of wireless devices or user equipment (UE) in a geographical area covered by a radio frequency transmission of the access node. The access node and the wireless devices communicate with each other to transmit signals or data using certain waveforms. The waveforms used for uplink communication and downlink communication may be the same or different. When the wireless devices are at different distances to the access node, or when the environment in which the communications take place changes, the signal strength for uplink and downlink communications may change. In addition, when both the access node and the wireless devices have multiple receivers and/or transmitters at their antennas, it is possible to transmit data using one or more layers on a resource block.

The current wireless networks use a single waveform for uplink transmission. This uplink scheme does not take into account that fact that the signal strength and/or the channel conditions often change dynamically over time due to, e.g., changes in the geographical location of the wireless devices relative to the access node, and changes in the communication environment. As a result, the single waveform for uplink transmission may not be suitable for certain circumstances. Therefore, there is a need for systems and methods that are capable of dynamically selecting or switching uplink waveforms for the wireless devices as the conditions and environment for uplink communication dynamically change.

OVERVIEW

Exemplary embodiments described herein include systems, methods, and processing nodes for dynamically selecting or switching uplink waveforms for wireless devices in a wireless network. An exemplary system described herein for switching an uplink waveform for a wireless device in a wireless network includes an access node configured to deploy a first radio air interface to provide wireless services to the wireless device. The access node includes a processor configured to receive a signal indicating a channel condition from the wireless device. The processor is also configured to determine whether to switch the uplink waveform for the wireless device based on the signal indicating the channel condition.

An exemplary method described herein for selecting an uplink waveform for a wireless device in a wireless network includes receiving, by a processor, a signal indicating a channel condition from the wireless device. The method also includes selecting, by the processor, the uplink waveform for the wireless device based on the signal indicating the channel condition.

An exemplary processing node described herein for selecting an uplink waveform for a wireless device in a wireless network is configured to perform various operations. The operations include receiving a signal indicating a channel condition from the wireless device. The operations also include selecting the uplink waveform from a plurality of waveforms for the wireless device based on the signal indicating the channel condition.

DETAILED DESCRIPTION

Exemplary embodiments described herein include systems, methods, and processing nodes for dynamically selecting or switching uplink waveforms for a wireless device in a wireless network. The disclosed systems and methods may be implemented in any wireless networks in which two or more waveforms are available for uplink communications, and in which channel conditions for the wireless device may change dynamically over time. By dynamically selecting or switching to a waveform that better suits the environment or channel condition experienced by the wireless device, uplink transmission efficiency and quality may be improved.

An access node, such as a base station for a wireless network may include a multi-input-multi-output (MIMO) antenna. Such an antenna may include an array of antenna elements or ports, enabling the base station to have multiple receivers and transmitters. Likewise, a wireless device, such as an end-user cell phone, may include an MIMO antenna that includes multiple receivers and multiple transmitters. When the access node and the wireless device communicate with one another, signal or data may be communicated from the access node to the wireless device (i.e., downlink communication), or from the wireless device to the access node (i.e., uplink communication). Current wireless networks use a single waveform for uplink communication. For example, current 4G-LTE technology employs an orthogonal frequency division multiple access ("OFDMA") waveform for downlink communication and a single-carrier frequency division multiple access ("SC-FDMA") waveform for uplink communication.

However, various factors may affect the uplink communication, making it difficult to have a single waveform satisfying for all conditions. For example, when the wireless device is located at a cell edge, the signal strength may be weak, which may require more transmission power. When the wireless device is close to a cell base station, the signal may be strong, which may require less transmission power. When the wireless device has multiple receivers and multiple transmitters in its antenna, data may be communicated from the wireless device either in a single layer or in multiple layers, depending on the conditions of uplink channels, such as the orthogonality of the uplink channels.

Different waveforms may be suitable for different uplink communication conditions. For example, in 5G NR or other advanced communications, two or more waveforms may be suitable for uplink communications. Each of the two or more waveforms may be better suited for a certain condition. Thus, it may be desirable to dynamically select or switch the uplink waveforms for a wireless device based on the channel conditions, such that efficiency and quality of services of the uplink wireless communication can be improved for the wireless device. The channel conditions may be conditions of an uplink channel. In some embodiments, conditions of an uplink channel may be reflected by conditions of a downlink channel. For example, when the uplink channel and downlink channel have reciprocity, such as, e.g., when the frequency bands for the uplink channel and the downlink channel are the same, the conditions of an uplink channel may be reflected by the conditions of a downlink channel. Thus, dynamically selecting or switching the uplink waveforms for the wireless device may be based on one or more parameters indicating the conditions of the downlink channel. In some embodiments, dynamically selecting or switching the uplink waveforms may be based on a combination of the one or more parameters indicating the conditions of the downlink channel, and one or more parameters indicating the conditions of the uplink channel. By dynamically selecting or switching the uplink waveforms based on the channel conditions (uplink, downlink, or both), the wireless network may provide more efficient and higher-quality services to the wireless device.

The term "wireless device" refers to any wireless device included in a wireless network. For example, the term "wireless device" may include a relay node, which may communicate with an access node. The term "wireless device" may also include an end-user wireless device, which may communicate with the access node through the relay node. The term "wireless device" may include an end-user wireless device that communicates with the access node directly without being relayed by a relay node.

The term "receiver" refers to an antenna port or element that is used for receiving data and/or signals. The term "transmitter" refers to an antenna port or element that is used for transmitting data and/or signals. The receiver and transmitter of a wireless device or access node may or may not use the same antenna port or element.

The term "port" refers to an antenna port. The port may be a physical port or may be a virtual, logical port. A port may be associated with one or more than one antenna element.

An exemplary system described herein includes at least an access node, such as an eNodeB, and a plurality of end-user wireless devices. The system may also include a relay node in wireless communication with the access node and configured to relay data packets between the access node and an end-user wireless device served by the relay node.

Relay nodes may improve service quality by relaying communication between the access node and one or more end-user wireless devices in the wireless network that are indirectly connected with the access node through the relay nodes. For example, relay nodes may be used at the edge of a coverage area of an access node to improve and/or extend coverage and service, as well as in crowded areas having a high number of end-user wireless devices to increase the available throughput to the end-user wireless devices being relayed by the relay nodes. The access node may be referred to as a "donor" access node. Relay nodes are generally configured to communicate with the "donor" access node via a wireless backhaul connection, and to deploy a radio air interface to which end-user wireless devices can attach. Donor access nodes generally include scheduling modules or schedulers for scheduling or allocating resources to wireless devices directly connected thereto, as well as to the relay nodes connected to the donor access nodes through the wireless backhaul connection.

For illustrative purposes and simplicity, the disclosed technology for dynamically selecting or switching uplink waveforms will be illustrated and discussed as being implemented in the communications between an access node (e.g., a base station) and a wireless device (e.g., an end-user wireless device or a relay node). It is understood that the disclosed technology for dynamically selecting or switching the uplink waveforms may also be applied to communications between an end-user wireless device and a relay node. For example, in some embodiments, based on one or more parameters indicating the conditions of a downlink channel between the end-user wireless device and the relay node, the relay node may select or switch uplink waveforms for the uplink communications between the relay node and the end-user wireless device. In some embodiments, based on one or more parameters indicating the conditions of an uplink channel between the end-user wireless device and the relay node, the relay node may select or switch uplink waveforms for the end-user wireless device. In some embodiments, based on at least one parameter indicating conditions of a downlink channel and at least one parameter indicating conditions of an uplink channel, the relay node may select or switch the uplink waveforms for the end-user wireless device. The relay node may perform the uplink waveform selecting or switching operations disclosed herein and discussed below using an access node as an example.

In addition to the systems and methods described herein, the operations for dynamically selecting or switching the uplink waveforms for a wireless device may be implemented as computer-readable instructions or methods, and processing nodes on the network for executing the instructions or methods. The processing node may include a processor included in the access node or a processor included in any controller node in the wireless network that is coupled to the access node.

Figure 1:
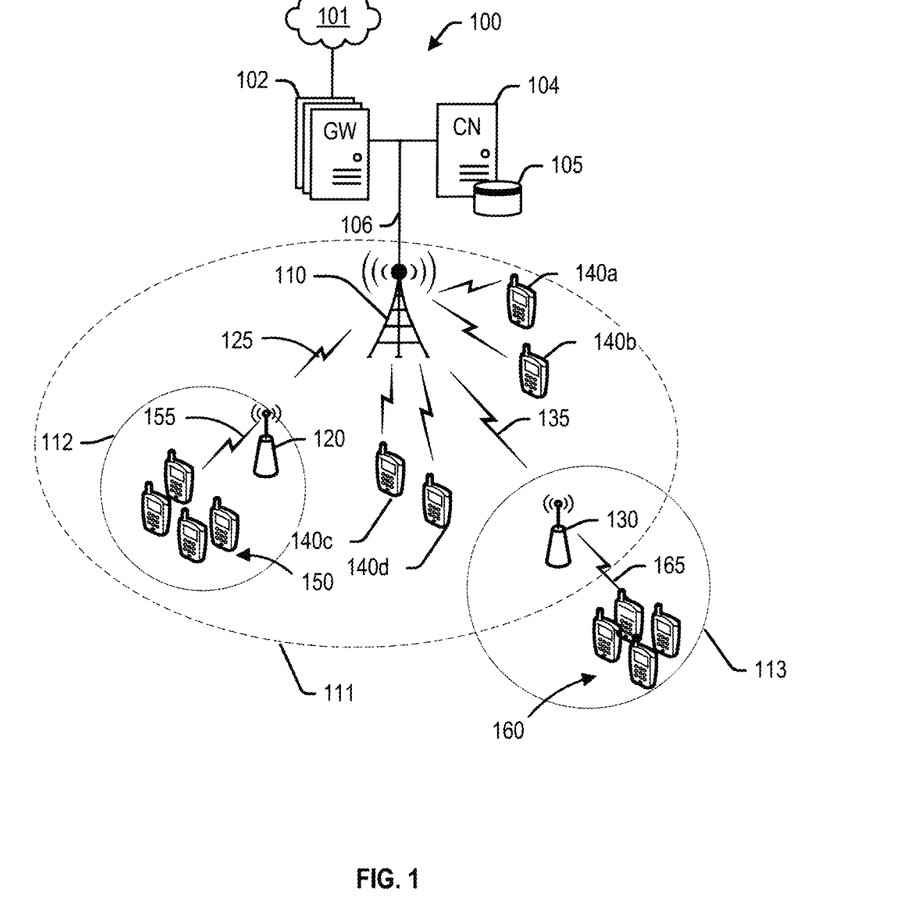
FIG. 1 depicts an exemplary system for wireless communication, in accordance with the disclosed embodiments.

FIG. 1 depicts an exemplary system for wireless communication. System 100 may be a wireless communication network, such as a cellular network. System 100 may include a communication network 101, a gateway 102, a controller node 104, and an access node 110. Access node 110 may deploy a first radio air interface serving one or more relay nodes 120 and 130, and one or more end-user wireless devices. One or more end-user wireless devices may be directly connected to access node 110, such as end-user wireless devices 140a, 140b, 140c, and 140d. One or more end-user wireless devices may be indirectly connected to access node 110 through relay nodes 120 and 130, such as end-user wireless devices 150 and 160. Hereinafter, for simplicity, the directly connected and indirectly connected end-user wireless devices are generally referred to as end-user wireless devices.

In the exemplary embodiment shown in FIG. 1, access node 110 may be a macro-cell access node configured to deploy a wireless radio air interface over a coverage area 111. Each of relay nodes 120, 130, and each of end-user wireless devices 140a, 140b, 140c, and 140d may be attached to the wireless air interface deployed by access node 110. Relay nodes 120 and 130 may be configured to communicate with access node 110 over wireless communication links 125 and 135, respectively (hereinafter, "wireless backhaul" or "backhaul"). Wireless links 125 and 135, as well as other wireless links that directly couple end-user wireless devices 140a, 140b, 140c, and 140d with access node 110, as shown in FIG. 1, form the wireless network (or wireless radio air interface) deployed by access node 110 within coverage area 111. Relay nodes 120 130 may be further configured to deploy additional wireless radio air interfaces over coverage areas 112 and 113, respectively. A plurality of end-user wireless devices 150 may be configured to attach to a wireless radio air interface or link 155 deployed by relay node 120, and a plurality of end-user wireless devices 160 may be configured to attach to a wireless air interface or link 165 deployed by relay node 130. All of the end-user wireless devices 150 and 160 are indirectly attached to the wireless radio air interface deployed by access node 110 through relay nodes 120 and 130.

In some embodiments, end-user wireless devices 150 and 160 may access network services using the combination of relay nodes 120 and 130, wireless backhaul links 125 and 135, and access node 110. In some embodiments, end-user wireless devices 140a, 140b, 140c, and 140d may access network services by directly connecting to access node 110. As shown in FIG. 1, end-user wireless devices 160 are illustrated as being located outside of coverage area 111 of access node 110. End-user wireless devices 160 may access network services provided by access node 110 through relay node 130. In this configuration, access node 110 may be referred to as a "donor" access node. In other embodiments, any other combination of donor access nodes, relay access nodes, and carriers deployed therefrom may be evident to those having ordinary skill in the art in light of this disclosure.

Access node 110 may be any network node configured to provide communication between end-user wireless devices 140a, 140b, 140c, 140d, 150, 160 and communication network 101, including standard access nodes such as a macro-cell access node, a base transceiver station, a radio base station, an eNodeB device, an enhanced eNodeB device, a gigabit NodeB (or gNodeB) in 5G New Radio ("5G NR"), or the like. For example, access node 110 may implement 5G NR technologies to deploy a wireless network that supports frequency bands ranging from, e.g., 600 MHz to 100 GHz. In some embodiments, access node 110 may deploy a wireless network that supports frequency bands ranging from 3 GHz to 100 GHz. In some embodiments, access node 110 may deploy a wireless network that supports multiple frequency bands selected from 3 GHz to 100 GHz. In an exemplary embodiment, a macro-cell access node 110 may have a coverage area 111 in the range of approximately five kilometers to thirty-five kilometers and an output power in the tens of watts. Relay nodes 120, 130 may include short range, low power, small-cell access nodes such as a microcell access node, a picocell access node, a femtocell access node, or a home eNodeB device. In addition, relay nodes 120, 130 may include a small-cell access node paired with a relay wireless device configured to communicate over one of wireless backhaul links 125, 135, respectively.

Access node 110 and relay nodes 120 and 130 may each include a processor and associated hardware circuitry configured to execute or direct the execution of computer-readable instructions to perform operations described herein. In some embodiments, access node 110 and relay nodes 120 and 130 may retrieve and execute software from a storage device, which may include a disk drive, a flash drive, a memory circuitry, or other memory device, and which may be local or remotely accessible. The software may include computer programs, firmware, or other form of machine-readable instructions, and may include an operating system, utilities, drivers, network interfaces, applications, or other type of software, including combinations thereof. Access node 110 and relay nodes 120 and 130 may receive instructions and other input at a user interface. Access node 110 may communicate with gateway 102 and controller node 104 via a communication link 106. Access node 110 and relay nodes 120 and 130 may communicate with each other, and other access nodes (not shown), using a wireless link or a wired link such as an X2 link. Components of access node 110 and relay nodes 120 and 130 are further described below.

End-user wireless devices 140a, 140b, 140c, 140d, 150, and 160 may be any device, system, combination of devices, or other such communication platform configured to wirelessly communicate with access node 110 and/or relay nodes 120 and 130 using one or more frequency bands deployed therefrom. End-user wireless devices 140a, 140b, 140c, and 140d may directly communicate with access node 110 without using a relay node, whereas end-user wireless devices 150 and 160 may indirectly communicate with access node using relay services provided by relay nodes 120 and 130. Each of end-user wireless devices 140a, 140b, 140c, 140d, 150, and 160 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that may send and receive signals or data. Other types of communication platforms are contemplated.

Communication network 101 may be a wired and/or wireless communication network. Communication network 101 may include processing nodes, routers, gateways, and physical and/or wireless data links for communicating signals among various network elements. Communication network 101 may include one or more of a local area network, a wide area network, and an internetwork (including the Internet). Communication network 101 may be capable of communicating signals, for example, to support voice, push-to-talk, broadcast video, and data communications by end-user wireless devices 150 and 160. Wireless network protocols may include one or more of Multimedia Broadcast Multicast Services (MBMS), code division multiple access (CDMA) 1×RTT (radio transmission technology), Global System for Mobile communications (GSM), Universal Mobile Telecommunications System (UMTS), High-Speed Packet Access (HSPA), Evolution Data Optimized (EV-DO), EV-DO rev. A, Worldwide Interoperability for Microwave Access (WiMAX), Third Generation Partnership Project Long Term Evolution (3GPP LTE), Fourth Generation broadband cellular (4G, LTE Advanced, etc.), and Fifth Generation mobile networks or wireless systems (5G, 5G New Radio ("5G NR"), or 5G LTE). Wired network protocols utilized by communication network 101 may include one or more of Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 may include additional base stations, controller nodes, telephony switches, internet routers, network gateways, computer systems, communication links, or other type of communication equipment, and combinations thereof. The wireless network provided by access node 110 may support any of the above-mentioned network protocols.

Communication link 106 may use various communication media, such as air, laser, metal, optical fiber, or other signal propagation path, including combinations thereof. Communication link 106 may be wired or wireless and may use various communication protocols such as Internet, Internet protocol (IP), local-area network (LAN), optical networking, hybrid fiber coax (HFC), telephony, T1, or other communication format, including combinations thereof. Wireless communication links may be a radio frequency, microwave, infrared, or other signal, and may use a suitable communication protocol, for example, Global System for Mobile telecommunications (GSM), Code Division Multiple Access (CDMA), Worldwide Interoperability for Microwave Access (WiMAX), Long Term Evolution (LTE), 5G NR, or combinations thereof. In some embodiments, communication link 106 may include Si communication links. Other wireless protocols may also be used. Communication link 106 may be a direct link or may include various intermediate components, systems, and networks. Communication link 106 may enable different signals to share the same link.

Gateway 102 may be a network node configured to interface with other network nodes using various protocols. Gateway 102 may communicate data (e.g., data related to a user) over system 100. Gateway 102 may be a standalone computing device, computing system, or network component, and may be accessible, for example, by a wired or wireless connection, or through an indirect connection such as through a computer network or communication network. For example, gateway 102 may include a serving gateway (SGW) and/or a public data network gateway (PGW), etc. One of ordinary skill in the art would recognize that gateway 102 is not limited to any specific technology architecture, such as Long Term Evolution (LTE) or 5G NR, and may be used with any network architecture and/or protocol.

Gateway 102 may include a processor and associated hardware circuitry configured to execute or direct the execution of computer-readable instructions to obtain information. Gateway 102 may retrieve and execute software from a storage device, which may include a disk drive, a flash drive, or a memory circuitry or device, and which may be local or remotely accessible. The software may include computer programs, firmware, or other form of machine-readable instructions, and may include an operating system, utilities, drivers, network interfaces, applications, or other type of software, including combinations thereof. Gateway 102 may receive instructions and other input at a user interface.

Controller node 104 may be a network node configured to communicate information and/or control information over system 100. For example, controller node 104 may be configured to transmit control information associated with a handover procedure. Controller node 104 may be a standalone computing device, computing system, or network component, and may be accessible, for example, by a wired or wireless connection, or through an indirect connection such as through a computer network or communication network. For example, controller node 104 may include one or more of a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 104 is not limited to any specific technology architecture, such as Long Term Evolution (LTE) or 5G NR, and may be used with any network architecture and/or protocol.

Controller node 104 may include a processor and associated hardware circuitry configured to execute or direct the execution of computer-readable instructions to obtain information. Controller node 104 may retrieve and execute software from a storage device, which may include a disk drive, a flash drive, a memory circuitry or device, and which may be local or remotely accessible. In an exemplary embodiment, controller node 104 may include a database 105 configured for storing information related to elements within system 100, such as configurations and capabilities of relay nodes 120 and 130, resource requirements of end-user wireless devices 140a, 140b, 140c, 140d, 150, and 160, priority levels associated therewith, and so on. The information may be requested by or shared with access node 110 via communication link 106, X2 connections, and so on. The software may include computer programs, firmware, or other form of machine-readable instructions, and may include an operating system, utilities, drivers, network interfaces, applications, or other type of software, and combinations thereof. For example, a processing node may be included in controller node 104 and configured to perform the operations described herein. In some embodiments, controller node 104 may receive instructions and other input at a user interface.

Other network elements may be included in system 100 and configured to facilitate communication but are omitted for clarity, such as base stations, base station controllers, mobile switching centers, dispatch application processors, and location registers such as a home location register or visitor location register. Furthermore, other network elements that are omitted for clarity may be included in system 100 to facilitate communication, such as additional processing nodes, routers, gateways, and physical and/or wireless data links for carrying data among the various network elements, e.g., between access node 110 and communication network 101.

Figure 2:
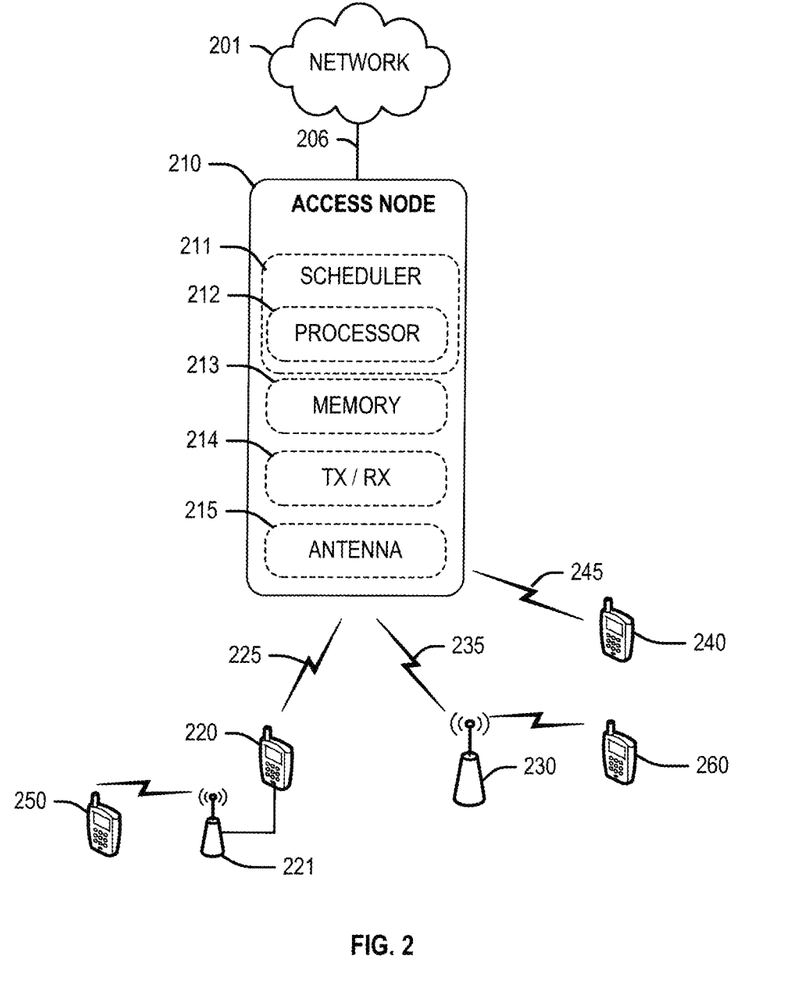
FIG. 2 depicts an exemplary access node, in accordance with the disclosed embodiments.

FIG. 2 depicts an exemplary access node 210. Access node 210 may include, for example, a macro-cell access node. Access node 210 may be an embodiment of access node 110 described with reference to FIG. 1. Access node 210 may include a scheduler 211, which may include a processor 212. Access node 210 may also include a memory 213, a transceiver 214, and an antenna 215. Scheduler 211 may be configured to schedule or allocate resources, including downlink and uplink resources, for relay nodes communicatively coupled to access node 210 and/or end-user wireless devices that are directly connected with access node 210. In some embodiments, processor 212 of scheduler 211 may be configured to execute instructions stored on memory 213 for performing various methods disclosed herein. Transceiver 214 and antenna 215 may be configured to enable wireless communication with a relay wireless device 220, a relay node 230, and an end-user wireless device 240.

Relay wireless device 220 may communicate with access node 210 through a wireless link 225. Relay node 230 may communicate with access node 210 through a wireless link 235. End-user wireless device 240 may communicate with access node 210 through a wireless link 240. Wireless links 225, 235, and 245 may form the wireless network (or wireless radio air interface) deployed by access node 210. Instructions stored on memory 213 may be accessed and executed by processor 212 to perform operations disclosed herein, such as deploying a wireless radio air interface (e.g., including wireless links 225, 235, and 245) via one or more of transceiver 214 and antenna 215. The operations performed by processor 212 may also include enabling relay wireless device 220, relay node 230, and end-user wireless devices 240 to access network services from a network 201 via access node 210.

Network 201 may be similar to network 101 discussed above. The operations performed by processor 212 may further include enabling relay wireless device 220 to communicate with end-user wireless device 250 and a relay access point 221, and enabling relay node 230 to communicate with end-user wireless device 260 and access node 210. Relay wireless device 220 and relay access point 221 may be referred to as a relay node as well. Although memory 213 is shown as separated from scheduler 211, in some embodiments, memory 213 may be included in scheduler 211. Alternatively, scheduler 211 may include an additional memory. In some embodiments, access node 210 may be referred to as a donor access node.

Figure 3:
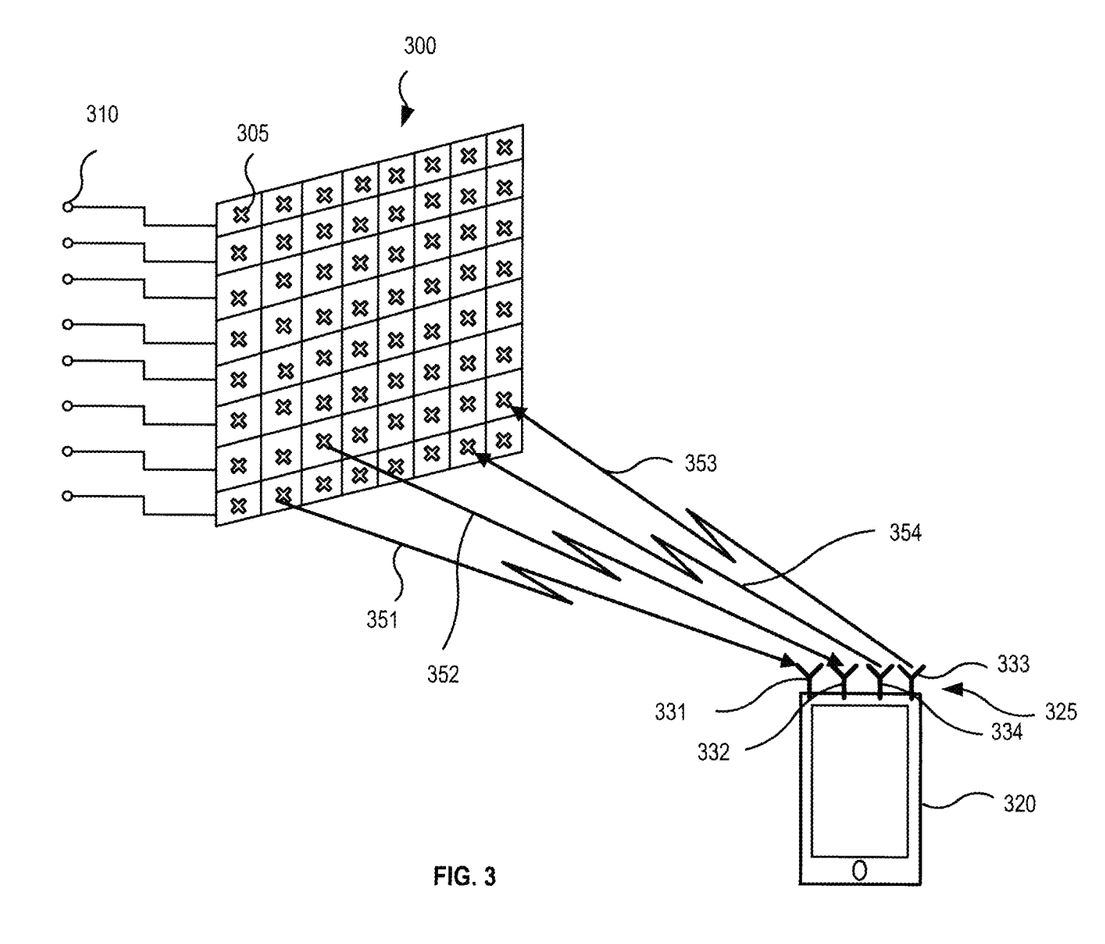
FIG. 3 depicts exemplary communications between an antenna of an access node and an antenna of a wireless device, in accordance with the disclosed embodiments.

FIG. 3 depicts an exemplary full dimension multi-input-multi-output (FD MIMO) antenna 300 that may be implemented in access node 110 or 210, and an antenna 325 that may be implemented in a wireless device, such as an end-user wireless device or a relay node, in accordance with the disclosed embodiments. The FD MIMO antenna 300 may be used at access node 110 or 210 for implementing the wireless radio air interface over the coverage area 111. For example, antenna 300 may be an embodiment of antenna 215. Antenna 300 may include an array of antenna elements 305 arranged on a plane, such as a metal plate. Each antenna element 305 may include one or more than one sub-element. The array may include N×M antenna elements, where N and M may be positive integer numbers, such as any of 1, 2, 3, 4, 5, . . . 64, 65, 66, etc. Antenna elements 305 may be grouped and configured (e.g., orientated) such that each group of antenna elements 305 may be associated with one or more communication links or beams. For example, each of antenna elements 305 may be configured to implement beamforming that enables directional transmission of signals in a predetermined direction covering a predetermined area. Antenna 300 may include a plurality of antenna ports 310. Each antenna port 310 may be associated with one or more antenna elements 305. For simplicity, not all antenna ports 310 are shown in FIG. 3. In some embodiments, antenna 300 may also be implemented in a relay node, such as relay node 120, 130, 221, 230, or in a relay wireless device, such as relay wireless device 220. For simplicity of discussion, antenna 300 is referred to as an antenna included in access node 110.

As shown in FIG. 3, a wireless device 320 may include antenna 325. Wireless device 320 may be an embodiment of an end-user wireless device, or a relay node. For example, wireless device 320 may be an embodiment of end-user wireless devices 104a, 140b, 140c, 140d, 150, 160, 240, 250, and 260. In some embodiments, wireless device 320 may be an embodiment of relay nodes 120, 130, 220, 221, 230. Antenna 325 of wireless device 320 may include one or more receivers configured to receive signals from access node 110 and one or more transmitters configured to transmit signals to access node 110. For example, antenna 325 may include a first receiver 331 and a second receiver 332. Antenna 325 may include a first transmitter 333 and a second transmitter 334. It is understood that antenna 325 may include fewer or more receivers and/or transmitters. The receivers included in wireless device 320 may be antenna elements or ports configured to receive signals from access node 110, and the transmitters included in wireless devices 320 may be antenna elements or ports configured to transmit signals to access node 110.

As shown in FIG. 3, receiver 331 may communicate with antenna 300 through a downlink channel 351, and receiver 332 may communicate with antenna 300 through a downlink channel 352. Although for illustrative purposes, each of receivers 331 and 332 is shown as receiving signals from a respective antenna element of antenna 300, it is understood that each receiver 331 and 332 may receive signals transmitted from multiple or all transmitting elements of antenna 300 via downlink channel 351 or downlink channel 352, respectively. Wireless device 320 may analyze, through a processor included in wireless device 320, the signals received via downlink channels 351 and 352, to determine a correlation between downlink channels 351 and 352. When two channels have a low correlation, it indicates that the two channels are independent. When two channels have a high correlation, it indicates that the two channels are not independent. When two channels (uplink or downlink) are independent (having a low correlation), data may be transmitted using two layers. For example, two data streams may be transmitted over the same resource block. When more than two channels (uplink or downlink) are independent, data may be transmitted using more than two layers. For example, when there are P independent channels (P being a positive integer), data may be transmitted using 1 to P layers. When two channels (uplink or downlink) are not independent (having a high correlation), or when there is a single transmitter, data may be transmitted over a single layer. In some embodiments, such as in spatial multiplexing, the number of layers used for transmitting data may be assigned according to a predetermined relationship with the number of codewords. In some embodiments, the number of layers may be less than or equal to the number of antenna ports used for transmission (or the number of transmitters).

The correlation between two channels (e.g., downlink channels 351 and 352, or uplink channels 353 and 354) may be measured by wireless device 320 based on the signals received or transmitted through these channels. In some embodiments, the correlation between channels may be measured by determining the orthogonality between two channels. For example, wireless device 320 may determine the orthogonality of downlink channels 351 and 352 based on the signals received from these channels. In some embodiments, wireless device 320 may determine the orthogonality of uplink channels 353 and 354 based on signals transmitted through these channels.

In some embodiments, the correlation between downlink channels 351 and 352 may be measured by wireless device 320 as a parameter named Rank Indicator ("RI"). Rank Indicator may be transmitted to access node 110 from wireless device 320 to indicate to access node 110 the number of layers that should be used for downlink transmission to wireless device 320. Wireless device 320 may measure the RI based on signals received through downlink channels 351 and 352. The RI may be related to the number of receivers included in wireless device 320. For example, when the number of receivers included in wireless device 320 is 2, the value of RI may be 1 or up to 2, depending on the correlation between the two channels associated with the two receivers. When two downlink channels 351 and 352 are highly correlated (e.g., not orthogonal), the RI may be 1, meaning data may be transmitted through 1 layer. When two downlink channels 351 and 352 are not correlated (e.g., highly orthogonal), the RI may be 2, meaning data may be transmitted through 2 layers. For the purpose of determining whether to dynamically select or switch uplink waveforms, the values of RI may be measured over a period of time and an average or mean value of the values of RI may be used. The average or mean value of the RI may be represented by $RI_m$. The $RI_m$ may be any value between 1 and 2. In general, when there are N receivers, the RI may be in a range from 1 to N, with N being the maximum possible value for RI.

Likewise, the value of $RI_m$ may be any value from 1 to N. The value of $RI_m$ may be an integer number, or may be a decimal number.

Transmitter 333 of wireless device 320 may be configured to transmit data to access node 110 through an uplink channel 353, and transmitter 334 may be configured to transmit data to access node 110 through an uplink channel 354. In some embodiments, wireless device 320 may transmit uplink data to access node 110 through either a single transmitter (e.g., transmitter 333 or 334) using a single channel 353 or 354, or through two transmitters (e.g., through both transmitter 333 and 334) using two channels 353 and 354. When there are T transmitters (T being a positive integer), data may be transmitted to access node using 1 to T layers, depending on the correlation between the channels associated with the transmitters. For example, when there are two transmitters, data may be transmitted through a single layer when the two uplink channels associated with the two transmitters are highly correlated (e.g., not orthogonal). When the two uplink channels associated with the two transmitters are not correlated (e.g., highly orthogonal), data may be transmitted through two layers. In some embodiments, access node may impose a limit on the number of layers that can be used for uplink transmission, where the limit may be less than the number of transmitters.

Figure 4:
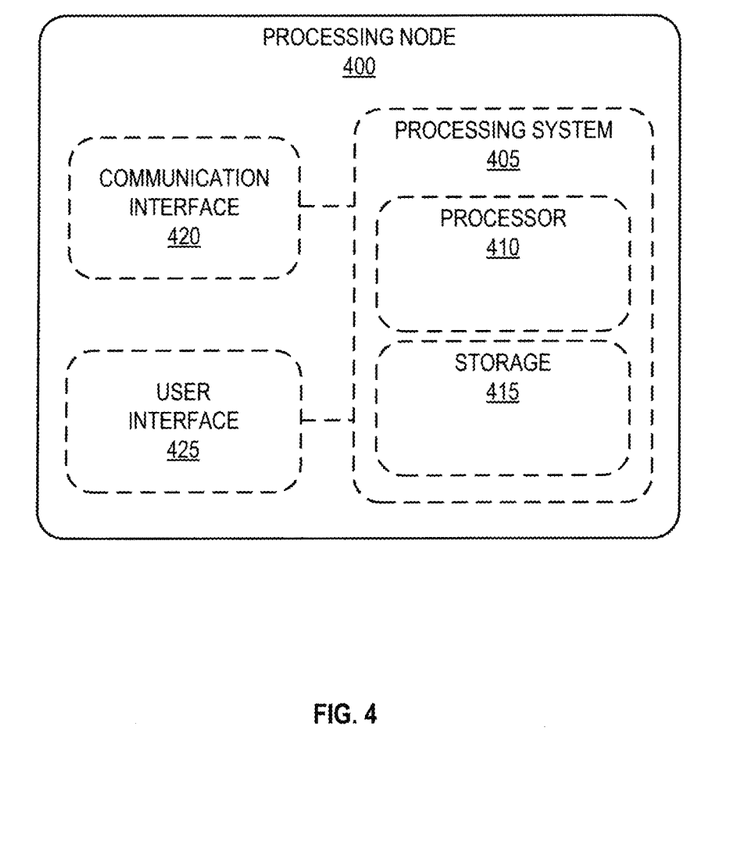
FIG. 4 depicts an exemplary processing node, in accordance with the disclosed embodiments.

FIG. 4 depicts an exemplary processing node 400, which may be configured to perform the methods and operations disclosed herein for dynamically selecting or switching uplink waveforms for a wireless device. In some embodiments, processing node 400 may be included in an access node, such as access node 110 or 210. In some embodiments, processing node 400 may be included in controller node 104, and may be configured for controlling the access nodes.

Processing node 400 may be configured for dynamically selecting or switching the uplink waveforms. Processing node 400 may include a processing system 405. Processing system 405 may include a processor 410 and a storage device 415. Storage device 415 may include a disk drive, a flash drive, a memory, or other storage device configured to store data and/or computer readable instructions or codes (e.g., software). The computer executable instructions or codes maybe accessed and executed by processor 410 to perform various methods disclosed herein. Software stored in storage device 415 may include computer programs, firmware, or other form of machine-readable instructions, including an operating system, utilities, drivers, network interfaces, applications, or other type of software. For example, software stored in storage device 415 may include a module for performing various operations described herein. Processor 410 may be a microprocessor and may include hardware circuitry and/or embedded codes configured to retrieve and execute software stored in storage device 415.

Processing node 400 may include a communication interface 420 and a user interface 425. Communication interface 420 may be configured to enable the processing system 405 to communicate with other components, nodes, or devices in the wireless network. Communication interface 420 may include hardware components, such as network communication ports, devices, routers, wires, antenna, transceivers, etc. User interface 425 may be configured to allow a user to provide input to processing node 400 and receive data or information from processing node 400. User interface 425 may include hardware components, such as touch screens, buttons, displays, speakers, etc. Processing node 400 may further include other components such as a power management unit, a control interface unit, etc.

Figure 5:
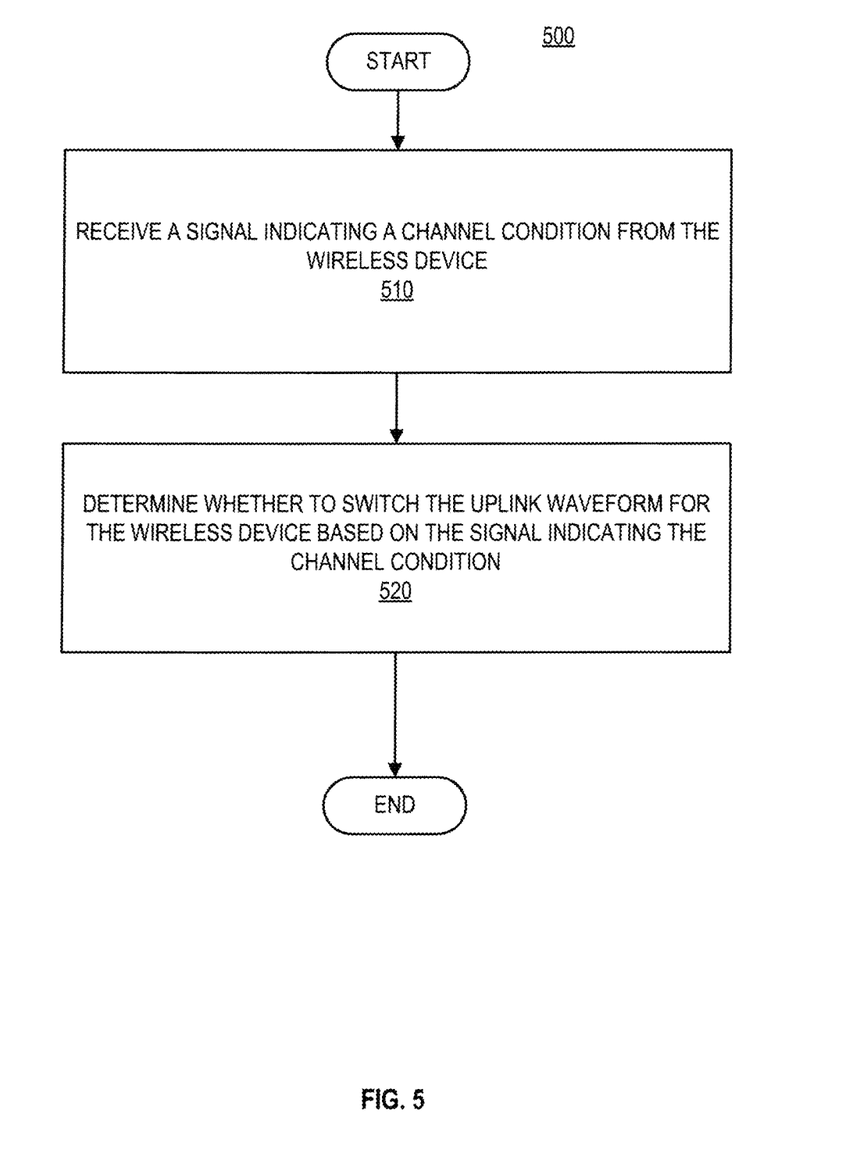
FIG. 5 depicts an exemplary method for dynamically selecting or switching uplink waveforms for a wireless device, in accordance with the disclosed embodiments.

The disclosed methods for dynamically selecting or switching uplink waveforms for a wireless device are discussed further below. FIG. 5 illustrates an exemplary method for dynamically selecting or switching uplink waveforms for a wireless device, such as wireless device 320. Method 500 may be performed by any suitable processor discussed herein, for example, a processor included in access node 110 or 210, processor 410 included in processing node 400, or a processor included in controller node 104. For discussion purposes, as an example, method 500 is described as being performed by a processor included in access node 110.

Method 500 may include receiving a signal indicating a channel condition from the wireless device (step 510). For example, access node 110 may receive a signal indicating a channel condition from wireless device 320. The channel condition may be a condition for a downlink channel, a condition for an uplink channel, or a combination thereof. In some embodiments, the signal indicating the channel condition may include one or more parameters indicating a downlink channel condition, one or more parameters indicating an uplink channel condition, or a combination thereof.

In some embodiments, the signal indicating the channel condition may include a first signal indicating a condition of an uplink channel, and a second signal indicating a condition of a downlink channel. The first signal indicating the condition of the uplink channel may include a signal or parameter named Sounding Reference Signal (SRS). The second signal indicating the condition of the downlink channel may include at least one of parameters named Channel Condition Indicator (CQI) and Rank Indicator (RI). Access node 110 may determine whether to dynamically select or switch the uplink waveform for wireless device 320 based on the first signal indicating the uplink channel condition and the second signal indicating the downlink channel condition.

Figure 6:
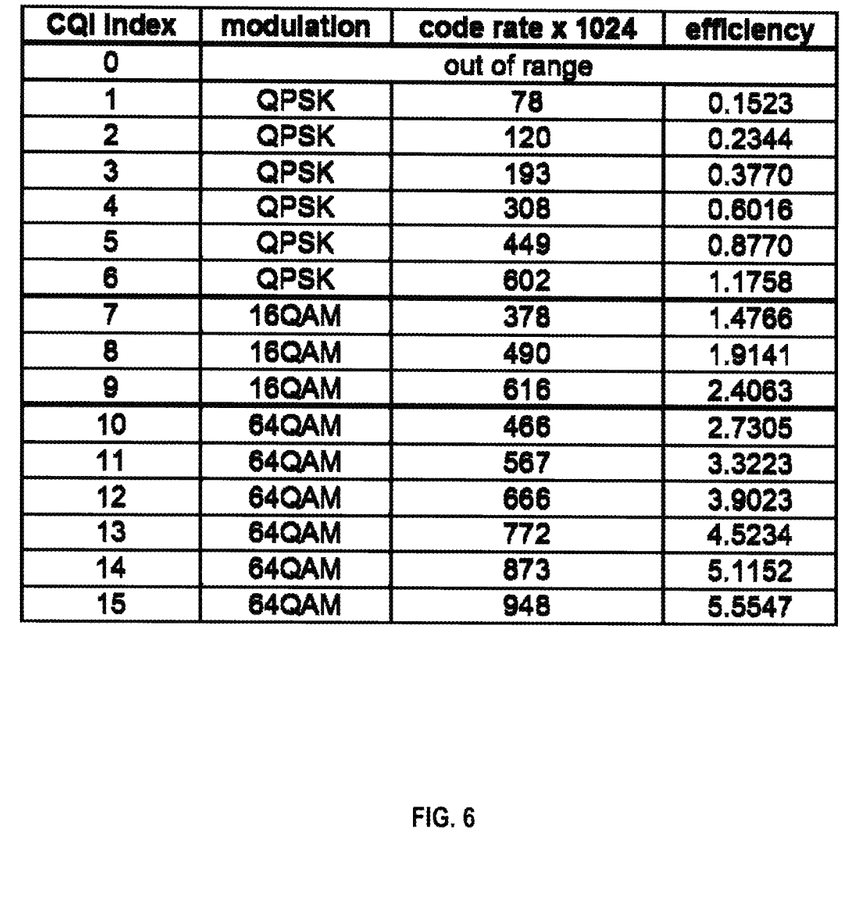
FIG. 6 depicts a table showing an exemplary relationship between the channel condition indicator (CQI) and the modulation and coding schemes (MCS), in accordance with the disclosed embodiments.

For example, wireless device 320 may measure the correlation between downlink channels 351 and 352, and may determine the values for CQI and RI. The CQI is an index having values ranging from, e.g., 0 to 15. The CQI reported by wireless device 320 indicates to access node 110 which modulation and coding scheme (MCS) to use for downlink transmission. The relationship between CQI and MCS is known in the art. FIG. 6 shows a table illustrating an exemplary relationship between CQI and the modulation scheme and coding scheme. For dynamically selecting or switching the uplink waveforms, the CQI values may be grouped into different categories or ranges. For example, the CQI values may be grouped into a low range, where CQI=0 to 3, a medium range where CQI=4 to 9, and a high range where CQI=10 to 15. Other ranges may also be used. Higher CQI values may indicate that wireless device 320 receives good coverage signals from access node 110 (e.g., when wireless device 320 is closer to access node 110), and lower CQI values may indicate that wireless device 320 receives poor coverage signals from access node 110 (e.g., when wireless device is far from access node 110).

Wireless device 320 may report the CQI to access node 110 periodically or aperiodically. For example, wireless device 320 may report the CQI to access node 110 periodically using Physical Uplink Control Channel (PUCCH). In some embodiments, wireless device 320 may report the CQI at an irregular time interval, for example, at any time when a trigger for reporting the CQI is received or determined. Wireless device 320 may measure the correlation between two or more downlink channels and may report the measured correlation to access node 110. In some embodiments, wireless device 320 may measure the correlation between two downlink channels over a period of time, and may calculate the average value of the correlation values. For example, wireless device 320 may measure the values of RI over a period of time and report the average or mean value of the RI (e.g., $RI_m$) to access node 110. In some embodiments, wireless device 320 may measure the values of RI and report the same to access node 110, and access node 110 may calculate the average value of the RI (e.g., $RI_m$).

Both CQI and RI reflect the channel conditions of the downlink channels. For a wireless network that implements time division duplex (TDD), the uplink and downlink channels have reciprocity because the frequency band used for the uplink and downlink channels may be the same. Thus, the CQI and RI values that indicate the downlink channel characteristics or conditions may be used to indicate conditions of an uplink channel. For example, the CQI and RI values reported from wireless device 320 may be used by access node 110 to determine whether to dynamically select or switch uplink waveforms for wireless device 320.

When a wireless network implements frequency division duplex (FDD), the uplink and downlink channels do not have reciprocity. Thus, the CQI and RI values may not be useful for indicating uplink conditions of an uplink channel. In such situations, wireless device 320 may report to access node 110 the uplink MCS, which may indicate the conditions of an uplink channel. Wireless device 320 may also report to access node 110 an uplink correlation measurement parameter that indicates the correlation of uplink channels. Wireless device 320 may measure the correlation of uplink channels based on signals transmitted over the uplink channels to determine the uplink correlation measurement parameter. Wireless device 320 may use the uplink MCS and the uplink correlation measurement parameter in determining whether to dynamically select or switch the uplink waveforms.

The CQI and RI may be independent from one another. For example, having a higher CQI value (e.g., when wireless device 320 is closer to access node 110) may not necessarily mean that the RI is greater than 1 (e.g., channels may not necessarily be independent from one another). For example, when the CQI value is high (e.g., CQI=15), RI may be 1, indicating two channels are highly correlated or are not independent, or 2, indicating two channels are not correlated or are independent. Likewise, having a lower CQI value (e.g., when wireless device 320 is far from access node 110) may not necessarily mean that the RI is 1 or less (e.g., channels may not necessarily be highly correlated). For example, when CQI is low (e.g., CQI=1), the RI may be 1, indicating that the two channels are highly correlated or are not independent, or 2, indicating that the two channels are not correlated or are independent. Similarly, when the CQI has a medium value (e.g., CQI=7), the RI may be 1 or 2, depending on the correlation of the channels.

The signal indicating the channel condition may also include a Sounding Reference Signal (SRS) that may be used to estimate the uplink channel condition. The SRS may be transmitted by wireless device 320 to access node 110 on a last symbol of a subframe. The SRS may report the channel quality of the overall bandwidth, which access node 110 may use to assign uplink resources, such as frequency bands, to wireless device 320. Wireless device 320 may report the SRS to access node 110 periodically or aperiodically. For example, wireless device 320 may report the SRS to access node 110 at every 2 ms, 4 ms, 6 ms, etc., through a signaling message. In some embodiments, wireless device 320 may report the SRS to access node 110 at every 320 ms. In some embodiments, wireless device 320 may report SRS to access node 110 at any time in response to a received or determined trigger.

Referring back to FIG. 5, method 500 may include determining whether to switch the uplink waveform for the wireless device based on the signal indicating the channel condition (step 520). For example, access node 110 may determine whether to switch uplink waveforms for wireless device 320 based on the signal received from wireless device 320 indicating the channel condition. Various waveforms may be implemented for uplink transmission or available for implementation. For example, in 5G NR, at least two waveforms may be used or available for uplink transmission: Discrete Fourier Transform-Spread-Orthogonal Frequency Division Modulation (DFT-S-OFDM) and Cyclic Prefix-Orthogonal Frequency Division Modulation (CP-OFDM). DFT-S-OFDM waveform may be better suited for weak signals (e.g., when wireless device is at a cell edge) and low capacity (e.g., using a single layer for transmission). That is, when signals are weak, and channels are highly correlated (or not independent), DFT-S-OFDM may be used for uplink transmission. Due to a lower peak to average power ratio (PAPR) than CP-OFDM, wireless device 320 may transmit signals using DFT-S-OFDM at a higher transmission power than CP-OFDM. CP-OFDM waveform may be better suited for strong signals (e.g., when wireless device is close to base station or access node, or in the middle area of the cell) and high capacity (e.g., using two or more layers for transmission). That is, when signals are strong and channels are not correlated (or are independent), CP-OFDM may be used for uplink transmission. Other waveforms may also be used for uplink transmission, such as those having a low peak to average power ratio (PAPR) for frequency of 52.6 GHz or higher. Examples of the PAPR waveforms may include Zero-Tail-Orthogonal Frequency Division Modulation (ZT-OFDM) waveforms and null cyclic prefix single carrier (NCP-SC) waveforms.

In some embodiments, access node 110 may determine whether to switch uplink waveforms (e.g., from a first uplink waveform to a second uplink waveform) for wireless device 320 based on at least one of the CQI, RI, and SRS. In other words, access node 110 may determine whether to switch uplink waveforms for wireless device 320 based on a signal indicating the channel condition of a downlink channel, of an uplink channel, or of a downlink channel and an uplink channel. For example, in one embodiment, the determination of whether to switch uplink waveforms for wireless device 320 may be based on the following exemplary scheme. When the RI (or $RI_m$) is equal to or less than a predetermined RI threshold value (e.g., 1), access node 110 may select or set a first uplink waveform (e.g., DFT-S-OFDM) for uplink transmission. When the RI (or $RI_m$) is equal to or less than the predetermined RI threshold value (e.g., 1), the CQI may be in any range (e.g., low, medium, or high). That is, regardless of whether the CQI is in a low range (e.g., CQI=0 to 3), a medium range (e.g., CQI=4 to 9), or a high range (e.g., CQI=10 to 15), when RI (or $RI_m$) is equal to or less than the predetermined RI threshold value (e.g., 1), DFT-S-OFDM may be used for uplink transmission. This is because when RI (or $RI_m$) is equal to or less than the predetermined RI threshold value (e.g., 1), the uplink channels have a high correlation (e.g., the uplink channels are not independent). Therefore, it is not desirable or possible to transmit data using two or more layers. Accordingly, access node 110 may set DFT-S-OFDM for the uplink transmission. In some embodiments, the predetermined RI threshold value may be a value that is close to 1, such as 1.05, 1.1, 1.2, 1.3, etc. In some embodiments, the predetermined RI threshold value may be any value between 1 and 1.5. For example, if the average value of RI (e.g., $RI_m$) is less than 1.5, access node 110 may determine that the channels are correlated (or not independent), and may set DFT-S-OFDM for the uplink transmission regardless of the CQI value.

When RI (or $RI_m$) is greater than the predetermined RI threshold value (e.g., 1), access node 110 may select or set CP-OFDM or DFT-S-OFDM as the uplink waveform depending on the value of CQI and whether the SRS satisfies one or more predetermined criteria. When the CQI is greater than or equal to a predetermined CQI threshold value (e.g., when CQI is greater than or equal to 4, i.e., at least in a medium or high range) and when the SRS satisfies one or more predetermined criteria, access node 110 may set CP-OFDM as the uplink transmission waveform. The one or more predetermined criteria for the SRS may include a predetermined signal to interference plus noise ratio (SINR) threshold and a predetermined channel impulse response amplitude variations threshold. For example, when the SRS's SINR is greater than the predetermined SINR threshold and the SRS's impulse response amplitude variations are smaller than the predetermined channel impulse response amplitude variations threshold, access node 110 may determine that the SRS satisfies the one or more predetermined criteria. When the SRS's SINR is lower than or equal to the predetermined SINR threshold and the SRS's impulse response amplitude variations are greater than or equal to the predetermined channel impulse response amplitude variations threshold, access node 110 may determine that the SRS does not satisfy the one or more predetermined criteria.

When RI (or $RI_m$) is greater than the predetermined RI threshold value (e.g., 1), and when the CQI is greater than or equal to the predetermined CQI threshold value (e.g., CQI is greater than or equal to 4), but if the SRS does not satisfy the one or more predetermined criteria, access node 110 may select or set DFT-S-OFDM as the uplink waveform.

When the RI (or $RI_m$) is greater than the predetermined RI threshold value (e.g., 1), and when the CQI is less than the predetermined CQI threshold value (e.g., when CQI is less than 4, i.e., when in the low range), access node 110 may set DFT-S-OFDM as the uplink transmission waveform.

Thus, access node 110 may dynamically determine whether to switch uplink waveforms based on a signal received from wireless device 320 that indicate a channel condition of an uplink channel and a downlink channel between wireless device 320 and access node 110. The switch of uplink waveforms may be dynamic because wireless device 320 may report parameters indicating the channel condition (e.g., CQI, RI, SRS) to access node 110 periodically or aperiodically, and the channel condition may change dynamically due to, e.g., weather, environment, location of wireless device 320, etc.

As discussed above, other waveforms may also be used for uplink transmission. It is possible that the switch may be made among two or more than two waveforms. Also as discussed above, when FDD is implemented, the RI (or $RI_m$) may be replaced by a parameter indicating a level of correlation between two or more uplink channels, and the CQI may be replaced by uplink MCS, for determining whether to switch uplink waveforms. Thus, for FDD wireless network, access node 110 may determine whether to switch the uplink waveform for wireless device 320 based on the parameter indicating a level of correlation between two or more uplink channels and the uplink MCS. For example, when the parameter indicates a low level of correlation between uplink channels (i.e., a high independence), access node 110 may set CP-OFDM as the uplink waveform if the MCS indicates that the signal strength is greater than or equal to a predetermined medium signal strength and when the SRS satisfies the one or more predetermined criteria. When the parameter indicates a low level of correlation between uplink channels (i.e., a high independence), but the MCS indicates that the signal strength is low than the predetermined medium signal strength, access node may set DFT-S-OFDM as the uplink waveform. When the parameter indicates a high level of correlation between uplink channels (i.e., a low independence), access node 110 may set DFT-S-OFDM as the uplink waveform regardless of the MCS values.

Method 500 may include other steps or operations. For example, step 520 may be replaced by dynamically selecting an uplink waveform from a plurality of waveforms based on the signal indicating the channel condition. The above discussion of switching waveforms under certain criteria also applies to the dynamic selection of the uplink waveform from a plurality of waveforms. For example, access node 110 may select DFT-S-OFDM or CP-OFDM as the uplink waveform when the signal indicating the channel condition satisfies certain predetermined criteria, as discussed above. Access node 110 may dynamically select the uplink waveform from a plurality of waveforms for a wireless device as the channel condition of an uplink channel changes over time. When there are two or more uplink channels, access node 110 may perform dynamic selection of uplink waveform from a plurality of available waveforms for each uplink channel based on the respective channel condition, which may be reflected by one or more uplink and/or downlink parameters as discussed above.

In some embodiments, method 500 may include determining to switch the uplink waveforms when the signal indicating the channel condition satisfies certain predetermined criteria, as discussed above. After determining to switch the uplink waveforms, access node 110 may switch uplink waveforms for wireless device 320. In some embodiments, access node 110 may send a message to wireless device 320 instructing wireless device 320 to switch from a first waveform (e.g., DFT-S-OFDM) to a second waveform (e.g., CP-OFDM) for uplink transmission, or vice versa. Wireless device 320 may switch from one uplink waveform to another, as indicated in the message received from access node 110, for uplink transmission.

The exemplary systems and methods described herein may be performed under the control of a processing system executing computer-readable codes embodied on a computer-readable recording medium or communication signals transmitted through a transitory medium. The computer-readable recording medium may be any data storage device that can store data readable by a processing system, and may include both volatile and nonvolatile media, removable and non-removable media, and media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium may also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A system for switching an uplink waveform for a wireless device in a wireless network, the system comprising:
an access node configured to deploy a first radio air interface to provide wireless services to the wireless device, the access node comprising:
a processor configured to:
receive a signal indicating a channel condition from the wireless device, wherein the signal indicating the channel condition comprises one or more parameters indicating a downlink channel condition; and
determine whether to switch the uplink waveform for the wireless device based on the one or more parameters indicating the downlink channel condition.

2. The system of claim 1, wherein the processor is further configured to switch the uplink waveform for the wireless device when the one or more parameters included in the signal indicating the channel condition satisfy one or more predetermined criteria.

3. The system of claim 1, wherein the one or more parameters indicating the downlink channel condition comprise a Channel Condition Indicator (CQI) and a Rank Indicator (RI).

4. The system of claim 1, wherein the signal indicating the channel condition comprises a second signal indicating an uplink channel condition, and the determining whether to switch the uplink waveform for the wireless device is further based on the second signal indicating the uplink channel condition.

5. The system of claim 4, wherein the signal indicating the uplink channel condition comprises a Sounding Reference Signal (SRS).

6. The system of claim 4, wherein the signal indicating the channel condition comprises a Channel Condition Indicator (CQI) and a Rank Indicator (RI) for a downlink channel, and a Sounding Reference Signal (SRS) for the uplink channel.

7. The system of claim 6, wherein the wireless network is configured to employ a same frequency band for the uplink channel and the downlink channel.

8. The system of claim 6, wherein the wireless network is configured to employ Time Division Duplex (TDD).

9. The system of claim 6, wherein the processor is configured to switch the uplink waveform from a first waveform to a second waveform when the CQI, RI, and SRS satisfied predetermined criteria.

10. The system of claim 9, wherein the processor is configured to: dynamically switch the uplink waveform from Discrete Fourier Transform-Spread-Orthogonal Frequency Division Modulation (DFT-S-OFDM) to Cyclic Prefix-Orthogonal Frequency Division Modulation (CP-OFDM) when the CQI is above a predetermined CQI threshold value, when the RI is greater than a predetermined RI threshold value, and when the SRS satisfies a predetermined criterion; and dynamically switch the uplink waveform from the CP-OFDM to DFT-S-OFDM when the RI is less than or equal to the predetermined RI threshold value.

11. The system of claim 10, wherein the predetermined RI threshold value is 1.

12. The system of claim 1, the wireless network is configured to employ Frequency Division Duplex (FDD), and wherein the signal indicating the channel condition comprises a parameter indicating a level of correlation between two or more uplink channels, and an uplink Modulation Coding Scheme (MCS).

13. A method for selecting an uplink waveform for a wireless device in a wireless network, the method comprising:
receiving, by a processor, a signal indicating a channel condition from the wireless device, wherein the signal indicating the channel condition comprises one or more parameters indicating a downlink channel condition; and
selecting, by the processor, the uplink waveform for the wireless device based on the one or more parameters indicating the downlink channel condition.

14. The method of claim 13, further comprising selecting the uplink waveform for the wireless device when one or more parameters included in the signal indicating the channel condition satisfy one or more predetermined criteria.

15. The method of claim 13, wherein the one or more parameters indicating the downlink channel condition comprises a Channel Condition Indicator (CQI) and a Rank Indicator (RI).

16. The method of claim 13, wherein the signal indicating the channel condition comprises a second signal indicating an uplink channel condition, and the selecting the uplink waveform for the wireless device is further based on the second signal indicating the uplink channel condition.

17. The method of claim 16, wherein the signal indicating the channel condition comprises a Channel Condition Indicator (CQI) for a downlink channel, a Rank Indicator (RI) for the downlink channel, and a Sounding Reference Signal (SRS) for the uplink channel.

18. A processing node for selecting an uplink waveform for a wireless device in a wireless network, the processing node being configured to perform operations comprising:
receiving a signal indicating a channel condition from the wireless device, wherein the signal indicating the channel condition comprises one or more parameters indicating a downlink channel condition; and
selecting the uplink waveform from a plurality of waveforms for the wireless device based on the one or more parameters indicating the downlink channel condition.

* * * * *